US012689882B2

(12) United States Patent    (10) Patent No.: US 12,689,882 B2

Hong                      (45) Date of Patent: Jul. 21, 2026

(54) METHOD AND USER EQUIPMENT FOR RESETTING PLMN ATTEMPT COUNTERS IN A TRACKING AREA UPDATE PROCEDURE FOR DISASTER ROAMING

(71) Applicant: H3NITY Co., Ltd., Yongin-si (KR)

(72) Inventor: Hyo Jin Hong, Seoul (KR)

(73) Assignee: H3NITY Co., Ltd., Yongin-si (KR)

( * ) Notice: Subject to any disclaimer, the term of this patent is extended or adjusted under 35 U.S.C. 154(b) by 0 days.

(21) Appl. No.: 19/465,366

(22) Filed: Jan. 30, 2026

(65) Prior Publication Data

US 2026/0156452 A1     Jun. 4, 2026

(30) Foreign Application Priority Data

Oct. 27, 2025    (KR) ........................ 10-2025-0156338
Jan. 19, 2026    (KR) ........................ 10-2026-0009778

(51) Int. Cl.
| | |
|---|---|
| *H04W 8/08* | (2009.01) |
| *H04W 4/90* | (2018.01) |
| *H04W 60/04* | (2009.01) |
| *H04W 84/04* | (2009.01) |

(52) U.S. Cl.
CPC .............. *H04W 8/08* (2013.01); *H04W 4/90* (2018.02); *H04W 60/04* (2013.01); *H04W 84/042* (2013.01)

(58) Field of Classification Search
CPC ......... H04W 8/08; H04W 4/90; H04W 60/04; H04W 84/042
See application file for complete search history.

(56) References Cited

U.S. PATENT DOCUMENTS

| | | | |
|---|---|---|---|
| 2019/0349845 A1* | 11/2019 | Huang-Fu ............. | H04W 48/16 |
| 2025/0089127 A1* | 3/2025 | Kim .................... | H04L 65/1095 |
| 2026/0046596 A1* | 2/2026 | Kumar .................... | H04W 4/90 |
| 2026/0046758 A1* | 2/2026 | Gupta ................... | H04W 48/18 |

* cited by examiner

*Primary Examiner* — Wayne H Cai
(74) *Attorney, Agent, or Firm* — Bridgeway IP Law Group, PLLC; Jihun Kim

(57)          ABSTRACT

According to one embodiment of this specification, there is provided an operation method of user equipment (UE). The method may comprise: maintaining a list of public land mobile network (PLMN)-specific attempt counters for a determined PLMN with disaster condition if the UE supports a minimization of service interruption (MINT)-evolved packet system (EPS) is supported; generating a tracking area update request message; setting an EPS update type in the tracking area update request message to a disaster roaming update, if the tracking area update request message is for the disaster roaming service; and inserting the determined PLMN with disaster condition into the tracking area update request message if the UE initiates a tracking area update procedure with the EPS update type set to the disaster roaming update.

12 Claims, 11 Drawing Sheets

METHOD AND USER EQUIPMENT FOR RESETTING PLMN ATTEMPT COUNTERS IN A TRACKING AREA UPDATE PROCEDURE FOR DISASTER ROAMING

CROSS-REFERENCE TO RELATED APPLICATIONS

This application claims the priority of Korean Patent Applications No. KR10-2025-0156338 filed on Oct. 27, 2025 and No. 10-2026-0009778 filed on Jan. 19, 2026, in the Korean Intellectual Property Office, the disclosure of which is incorporated herein by reference.

BACKGROUND OF THE DISCLOSURE

Field of the Disclosure

The present specification relates to a 3GPP wireless communication system.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that |

TABLE 1-continued

| REFERENCE POINT | DESCRIPTION |
| --- | --- |
| | provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

SUMMARY OF THE DISCLOSURE

The disclosure of this specification aims to provide a method and user equipment for resetting public land mobile network (PLMN) attempt counters in a tracking area update procedure for disaster roaming.

According to one embodiment of this specification, there is provided an operation method of user equipment (UE). The method may comprise: maintaining a list of public land mobile network (PLMN)-specific attempt counters for a determined PLMN with disaster condition if the UE supports a minimization of service interruption (MINT)-evolved packet system (EPS) is supported; generating a tracking area update request message; setting an EPS update type in the tracking area update request message to a disaster roaming update, if the tracking area update request message is for the disaster roaming service; inserting the determined PLMN with disaster condition into the tracking area update request message if the UE initiates a tracking area update procedure with the EPS update type set to the disaster roaming update; and resetting a PLMN-specific attempt counter of a first PLMN for the determined PLMN with disaster condition, if a tracking area update accept message is received from the first PLMN and if the tracking area update accept message is for the disaster roaming service.

According to one embodiment of this specification, there is also provided a user equipment (UE). The UE may comprise: at least one processor; and at least one computer memory operably connectable to the at least one processor and storing instructions that, when executed by the at least one processor, perform operations comprising: maintaining a list of public land mobile network (PLMN)-specific attempt counters for a determined PLMN with disaster condition if the UE supports a minimization of service interruption (MINT)-evolved packet system (EPS) is supported; generating a tracking area update request message; setting an EPS update type in the tracking area update request message to a disaster roaming update, if the tracking area update request message is for the disaster roaming service; inserting the determined PLMN with disaster condition into the tracking area update request message if the UE initiates a tracking area update procedure with the EPS update type set to the disaster roaming update; and resetting a PLMN-specific attempt counter of a first PLMN for the determined PLMN with disaster condition, if a tracking area update accept message is received from the first PLMN and if the tracking area update accept message is for the disaster roaming service.

According to one embodiment of this specification, there is also provided a semiconductor chipset. The semiconductor chipset may comprise: at least one processor; and at least one memory capable of storing instructions and being connected electrically to the at least one processor operably. Operations, performed when the instructions are executed by the at least one processor, may comprise: maintaining a list of public land mobile network (PLMN)-specific attempt counters for a determined PLMN with disaster condition if the UE supports a minimization of service interruption (MINT)-evolved packet system (EPS) is supported; generating a tracking area update request message; setting an EPS update type in the tracking area update request message to a disaster roaming update, if the tracking area update request message is for the disaster roaming service; inserting the determined PLMN with disaster condition into the tracking area update request message if the UE initiates a tracking area update procedure with the EPS update type set to the disaster roaming update; and resetting a PLMN-specific attempt counter of a first PLMN for the determined PLMN with disaster condition, if a tracking area update accept message is received from the first PLMN and if the tracking area update accept message is for the disaster roaming service.

According to one embodiment of this specification, there is also provided a non-volatile computer-readable storage medium recording instructions for a user equipment (UE). The instructions, when executed by one or more processors, instruct the one or more processors to perform operations comprising: maintaining a list of public land mobile network (PLMN)-specific attempt counters for a determined PLMN with disaster condition if the UE supports a minimization of service interruption (MINT)—evolved packet system (EPS) is supported; generating a tracking area update request message; setting an EPS update type in the tracking area update request message to a disaster roaming update, if the tracking area update request message is for the disaster roaming service; inserting the determined PLMN with disaster condition into the tracking area update request message if the UE initiates a tracking area update procedure with the EPS update type set to the disaster roaming update; and resetting a PLMN-specific attempt counter of a first PLMN for the determined PLMN with disaster condition, if a tracking area update accept message is received from the first PLMN and if the tracking area update accept message is for the disaster roaming service.

The method and/or operations may further comprise: determining whether the UE supports the MINT-EPS.

The method and/or operations may further comprise: resetting the PLMN-specific attempt counter of the first PLMN for the determined PLMN with disaster condition, if an attach accept message is received from the first PLMN and if the attach accept message is for the disaster roaming service.

The determined PLMN with disaster condition may be inserted into the tracking area update request message, if the UE has determined the determined PLMN with disaster condition, and if an additional globally unique temporary identifier (GUTI) is included in the tracking area update request message and does not contain a valid GUTI mapped from a 5G-GUTI which was previously assigned.

The determined PLMN with disaster condition may be inserted into the tracking area update request message, if the UE has determined the determined PLMN with disaster condition, and if an additional GUTI is not included in the tracking area update request message and an EPS mobility identity does not contain a valid GUTI mapped from a 5G-GUTI which was previously assigned.

According to one aspect of the disclosure of the present specification, there is provided a method and user equipment for resetting public land mobile network (PLMN) attempt counters in a tracking area update procedure for disaster roaming.

According to the present invention, service interruption that may occur while a terminal (UE) acquires and maintains EPS-based communication services under a disaster situation can be effectively minimized. Specifically, the terminal determines whether a disaster situation exists by comprehensively considering persistence of disaster-related indications, reception frequency thereof, and past disaster roaming history, thereby preventing malfunctions caused by temporary signal errors or abnormal network conditions.

In addition, according to the present invention, the terminal does not arbitrarily select a PLMN to be used in a disaster situation, but determines priorities based on a disaster-dedicated PLMN list, past successful connection history, and network load information. As a result, the success rate of disaster roaming is improved and unnecessary retry attempts are reduced. Accordingly, signaling load on the terminal and the network is reduced, enabling more stable communication service provision even in a disaster situation.

Furthermore, even when receiving an attach reject message or a tracking area update reject message that is not integrity-protected, the terminal can continue disaster roaming services in a security-vulnerable environment by evaluating the reliability of the message and adaptively controlling timers and attempt counters. In addition, by re-verifying the disaster roaming state and maintaining state flags even after an attach acceptance, consistent service control can be maintained while the disaster situation persists.

Moreover, the present invention provides an effect of reducing unnecessary network transitions and terminal power consumption by intelligently controlling tracking area update procedures and inter-system transitions. As a result, the present invention provides remarkable effects of simultaneously improving communication stability, resource efficiency, and service continuity in disaster situations.

DESCRIPTION OF EXEMPLARY EMBODIMENTS

Figure 1:
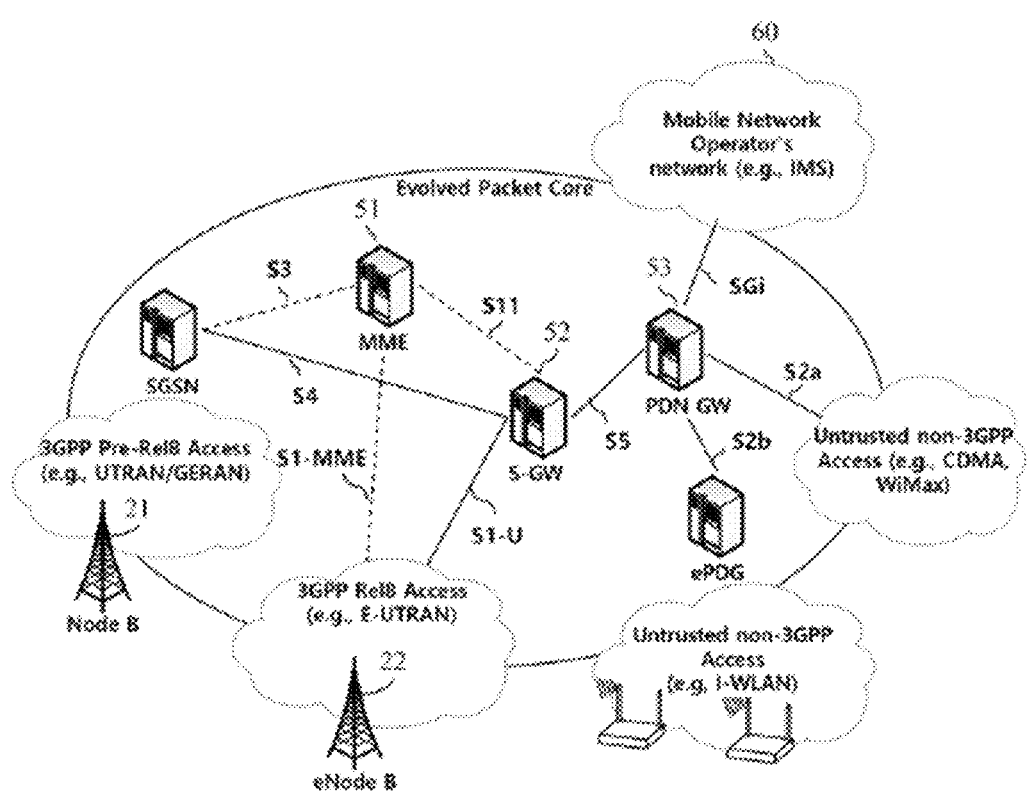
FIG. 1 is a view illustrating the structure of an evolved mobile communication network.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS EPS: stands for Evolved Packet System and means a mobile communication system including a UE, an access network including LTE, and an EPC PDN (Public Data Network): an independent network in which a service providing server is located PDN connection: connection from UE to PDN, i.e., association (connection) between a UE represented with an IP address and a PDN represented with an APN (access point name)

PDN-GW (Packet Data Network Gateway): a network node of an EPS network performing functions such as UE IP address allocation, packet screening & filtering, and charging data collection Serving GW (Serving Gateway): a network node of an EPS network performing functions such as mobility anchor, packet routing, idle mode packet buffering, and triggering MME to page UE PCRF (Policy and Charging Rule Function): an EPS network node performing policy decision for dynamically applying QoSs and billing policies differentiated per service flow APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

TEID (Tunnel Endpoint Identifier): End point ID of a tunnel configured between nodes in a network. A TEID is configured per section by the bearer of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e) NodeB: collectively denotes NodeB and eNodeB

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameters associated with NAS functionality Hereinafter, the present disclosure is described with reference to the accompanying drawings.

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

Figure 2:
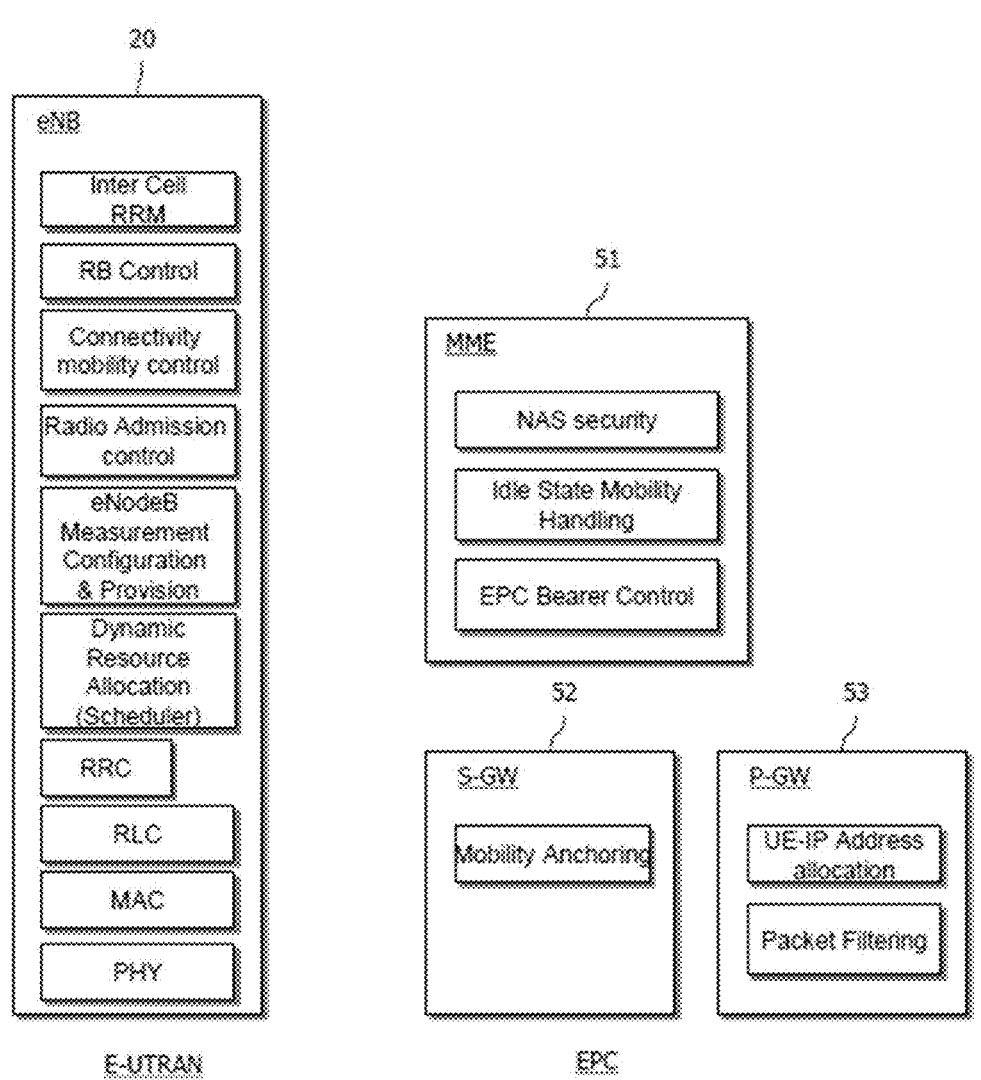
FIG. 2 is an exemplary view illustrating functions of main nodes of a common E-UTRAN and a common EPC.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control.

The EPC can perform functions, such as the generation of paging, the management of an LTE_IDLE state, the ciphering of a user plane, control of an EPS bearer, the ciphering of NAS signaling, and integrity protection.

Figure 3:
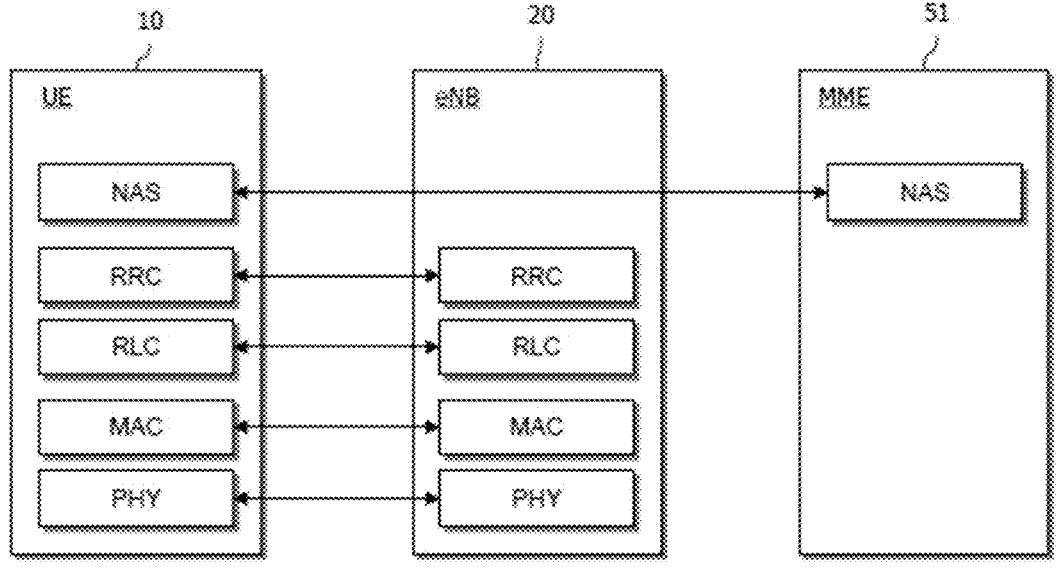
FIG. 3 is an exemplary view illustrating the structure of a radio interface protocol in a control plane between a UE and an eNodeB.
Figure 4:
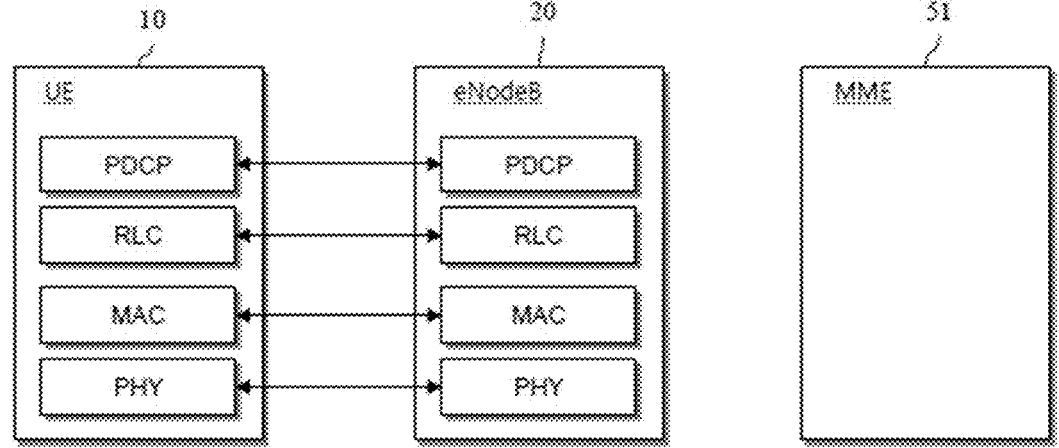
FIG. 4 is another exemplary view illustrating the structure of a radio interface protocol in a user plane between a UE and a base station.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VOIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VOIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Figure 5:
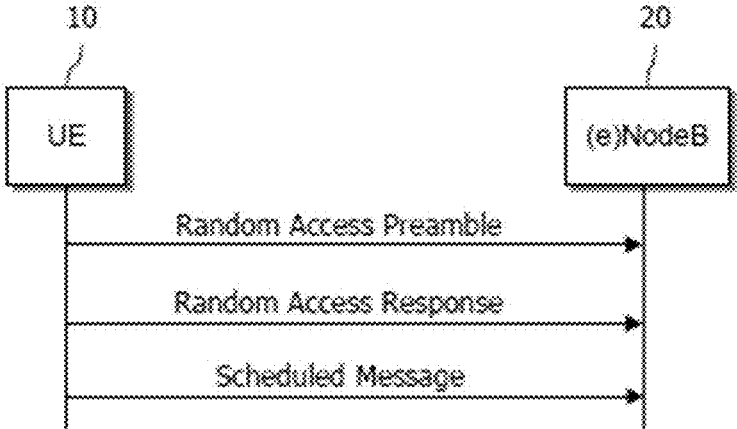
FIG. 5 is a flowchart illustrating a random access procedure in 3GPP LTE.

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

Figure 6:
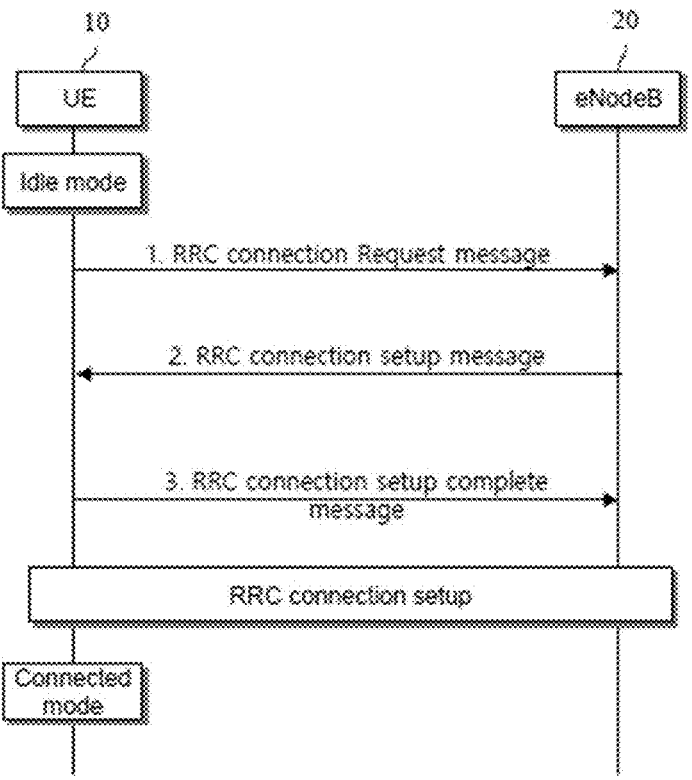
FIG. 6 illustrates a connection process in a radio resource control (RRC) layer.

FIG. 6 illustrates a connection process in a radio resource control (RRC) layer.

FIG. 6 shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Figure 7:
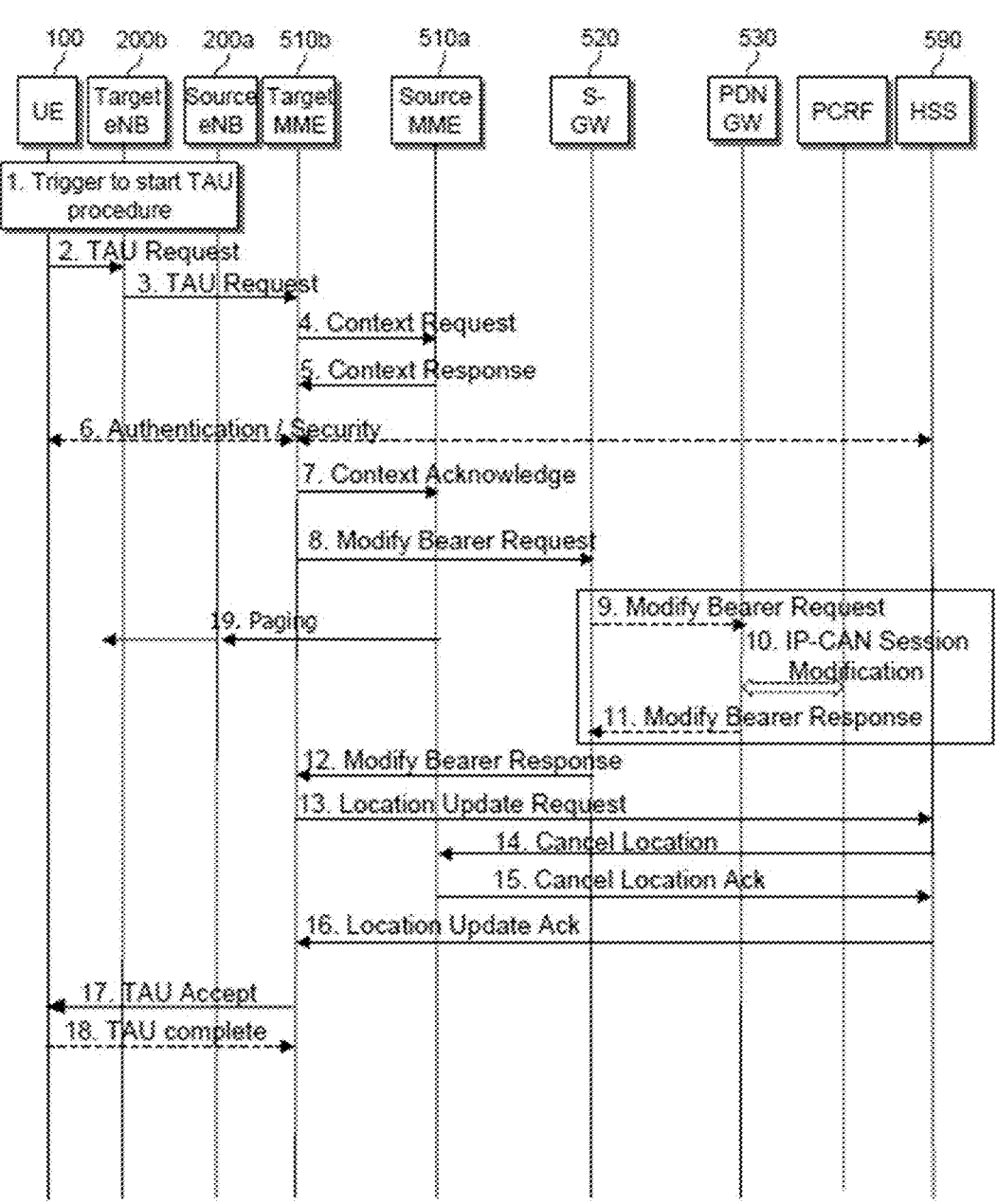
FIG. 7 is an exemplary view illustrating a Tracking Area Update (TAU) procedure.

FIG. 7 shows an exemplary Tracking Area Update (TAU) procedure.

1) In idle mode, the UE 100 moves into the coverage of the target eNodeB 200b. Accordingly, a Tracking Area Update (TAU) procedure is determined to start.

2) Then, the UE 100 sends a TAU request message to the target eNodeB 200b.

3) Then, the target eNodeB 200b determines a responsible MME. In this case, assume, for example, that the target MME 510b is determined as a proper responsible MME. The target eNodeB 200b transfers the TAU request message to the target MME 510b. In this case, assume that the S-GW 520 is not changed.

4-5) Then, the target MME 510b sends the UE's context request (e.g., Context Request) to the source MME 510a, and in response, receives a context response (e.g., Context Response). This is a process to obtain PDN connection-related information and EPS bearer-related information from the source MME 510a.

6) The UE 100 conducts an authentication/security procedure with the target MME 510b, and the target MME 510b conducts a security procedure with the HSS 590.

7) Meanwhile, the target MME 510b transmits to the source MME 510a a context acknowledge (e.g., Context Acknowledge) message in response to obtaining the context.

8) Subsequently, the target MME 510b, since the S-GW 520 is not changed by the TAU, transmits to the S-GW 520 a bearer modification request message (e.g., Modify Bearer Request), not a session creation request message (e.g., Create Session Request).

9-11) Then, the S-GW 520 transmits a bearer modification request message to the PDN-GW 530 as necessary. The PDN-GW 530 performs an IP-CAN session modification procedure as necessary. The PDN-GW 530 transmits a bearer modification response message (e.g., Modify Bearer Response) to the S-GW 520.

12) Then, the S-GW 520 transmits a bearer modification response message to the target MME 510b.

13) Then, the target MME 510b transmits to the HSS 590 a location update request message (e.g., Update Location Request).

14-15) Then, the HSS 590 transmits a location cancel message (e.g., Cancel Location) to the source MME 510a, and the source MME 510a transmits a location cancel acknowledgement message (e.g., Cancel Location Ack) to the HSS 590.

16) Then, the HSS 590 transmits a location update acknowledgement message (e.g., Update Location Ack) to the target MME 510b.

17-18) Then, the target MME 510b transmits a TAU accept message (e.g., TAU accept) to the UE 100 through the target eNodeB 200b, and the UE 100 transmits a TAU complete message (e.g., TAU Complete) to the target MME 510b as necessary.

Hereinafter, the following Table 2 to Table 9 show the messages used in each process.

First, the TAU request message may contain one or more pieces of information as shown in Table 2.

TABLE 2

| |
| --- |
| Protocol discriminator |
| Security header type |
| Tracking area update request message identity |
| EPS update type |
| NAS key set identifier |
| Old GUTI |
| Non-current native NAS key set identifier |
| GPRS ciphering key sequence number |
| Old P-TMSI signature |
| Additional GUTI |
| NonceUE |
| UE network capability |
| Last visited registered TAI |
| DRX parameter |
| UE radio capability information update needed |
| EPS bearer context status |
| MS network capability |
| Old location area identification |
| TMSI status |
| Mobile station classmark 2 |
| Mobile station classmark 3 |
| Supported Codecs |
| Additional update type |
| Voice domain preference and UE's usage setting |
| Old GUTI type |
| Device properties |
| MS network feature support |
| TMSI based NRI container |

The EPC Update type information element shown in Table 2 above may contain the following bits.

TABLE 3

| |
| --- |
| EPC Update Type Value |
| 000: indicates TAU |
| 001: indicates joint update of TAU/LA(Location Area) |
| 010: indicates joint update of TAU/LA (Location Area) together with IMSI attach |
| 011: indicates periodic update |
| 100: unused (if used, interpreted as TAU) |
| 101: unused (if used, interpreted as TAU) |
| "Active" flag (octet 1, bit 4) |
| 0: bearer creation not requested |
| 1: bearer creation requested |

Meanwhile, the above-described context request message may contain the information elements shown in the following Table 4.

TABLE 4

| Information elements | Conditions/descriptions |
| --- | --- |
| IMSI | should be included in case UE successfully authenticated |
| GUTI | A new target MME should include over S10 interface |
| | may be included if SRVCC procedure from UTRAN/GERN to E-UTRAN is available |
| Complete TAU request message | a new target MME may include if previous source MME needs it for acknowledgement of no decision |
| RAT Type | indicates what radio access technology is in use |
| Target PLMN ID | if available, may be included for previous MME to determine whether unused authentication vector is to be distributed |
| MME node name | is transferred by a new target MME if the new target MME and associated S-GW both support SR |

Meanwhile, the context response message may contain the information elements shown in the following Table 5.

TABLE 5

| Information element | Conditions/descriptions |
| --- | --- |
| IMSI | IMSI necessarily included except emergency even when UE does not have UICC |
| MME/SGSN UE EPS PDN Connections | Included in case at least one PDN connection is present for UE. |
| SGW node name | Indicates the identifier that has been used to identify S-GW by previous source MME |
| Trace Information | may be included in case session tracking is activated |
| Subscribed RFSP Index | May be included during mobility procedure between MMEs |
| UE Time Zone | Included by source MME |
| MME node name | Transmitted by previous source MME in case previous MME and associated S-GW both support ISR |

The information on the PDN connection in the context response message may contain the information elements shown in the following Table 6.

TABLE 6

| | |
| --- | --- |
| APN Restriction | Indicates limitations on combinations of APN types for APNs related to bearer context. Target MME or SGSN may determine the largest APN limitation using the APN limitations. |
| Linked EPS Bearer ID | Indicates basic bearer of PDN connection |
| PGW node name | may be included in case source MME has the overall name (e.g., FQDN) of PDN GW |
| Bearer Contexts | a number of pieces of information of such type may be included |
| Charging characteristics | May be included in case billing information is offered by HSS to MME |
| Change Reporting Action | May be included whenever available by source MME |

The bearer context information included in the PDN connection information in the context response may contain the information shown in the following Table 7.

TABLE 7

| Information elements | Conditions/descriptions |
| --- | --- |
| PGW S5/S8 IP Address and TEID for user plane | May be included for GTP-based S5/S8 |
| Bearer Level QoS | |
| BSS Container | MME may include packet flow ID, radio priority, SAPI, PS handover XID parameter in TAU/RAU/ handover procedure-related message |
| Transaction Identifier | may be transmitted over S3/S10/S16 in case UE supports A/Gb and/or Iu mode |

The TAU accept message may contain the information shown in the following Table 8.

TABLE 8

| Information | Description |
| --- | --- |
| TAU accept message identifier | message identifier |
| TAU result | indicate result of update, e.g. success or fail |
| T3412 value | timer value for periodic TAU |
| T3402 value | timer starting upon TAU failure |
| T3412 extended value | extended value of T3412 for further lengthening periodic TAU |

In Table 8 above, the T3412 value is a value for allowing the UE 100 to conduct periodic TAU. In order to reduce network load by such periodic TAU, the T3412 extended value is present which allows TAU to be conducted at a longer period. The T3412 extended value may be set up in the MME or may be retained as subscriber information in the HSS 540.

Figure 8:
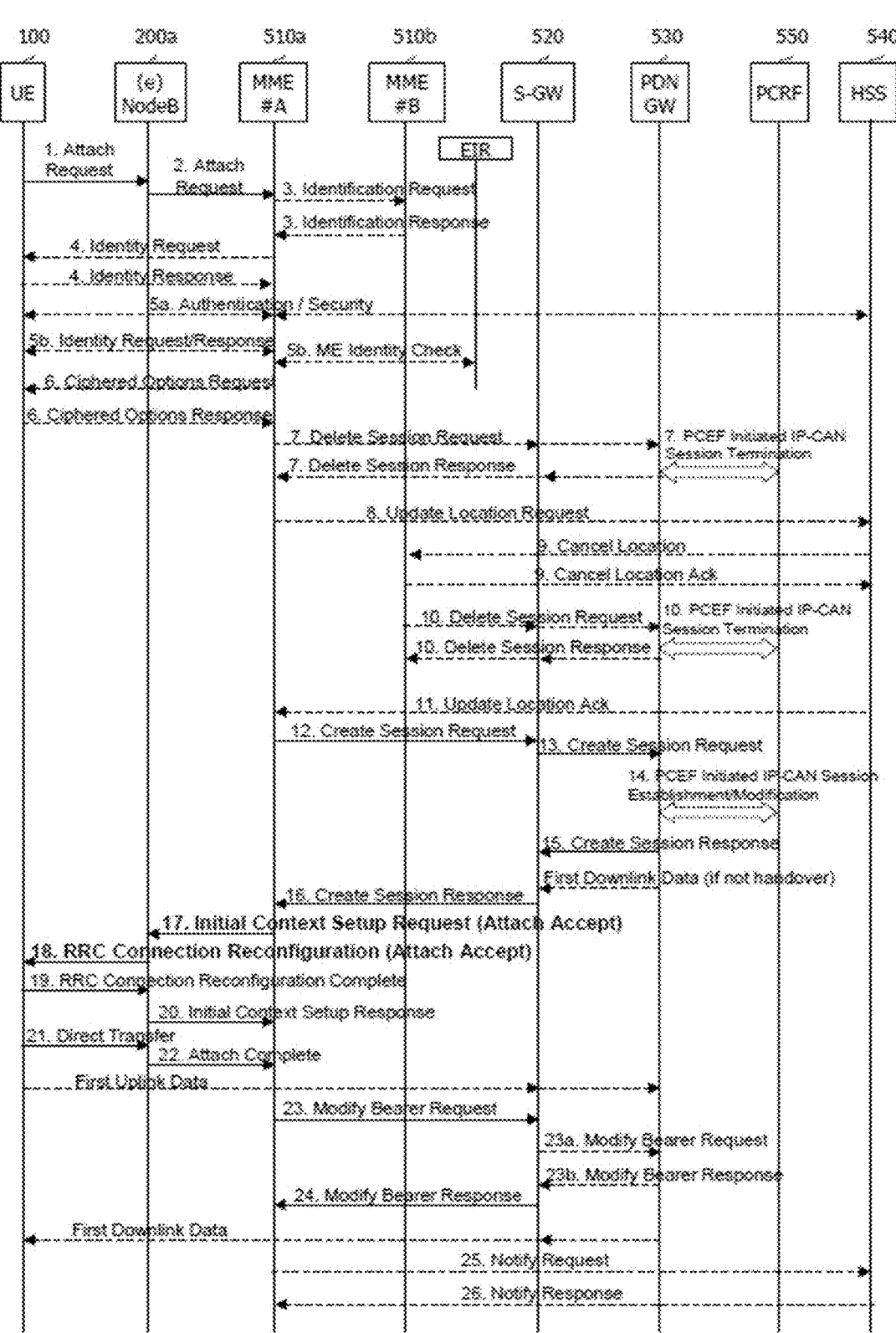
FIG. 8 illustrates a process in which a UE attaches, i.e., connects, to a network.

FIG. 8 illustrates a process in which a UE attaches, i.e., connects, to a network.

1) First, the UE 100 sends (e) an Attach Request message to the NodeB 200*a*.

The attach request message is a message sent by the UE when the UE is powered on or initially performs attach, such as during roaming or handover.

2) The (e) NodeB 200*a* may then receive the attach request message and send the received attach request message to the MME #A 510*a*.

10) The MME #a 510*a* includes an Attach Accept message in an S1-AP based Initial Context Setup message, e.g. an Initial Context Set up Request message, and sends it to the (e) NodeB 200*a*.

The Attach Accept message triggers a radio bearer setup between the (e) NodeB 200*a* and the UE 100.

18-19) The (e) NodeB 200*a* and the UE 100 perform an RRC connection procedure.

20) The (e) NodeB 200*a* sends an Initial Context Setup Response message to the MME #a 510*a*.

22) The (e) NodeB 200*a* sends an Attach Complete message, e.g., Attach Complete, to the MME #A 510*a*. Thus, a tunnel is established between the UE 100 and the S-GW 520. The Attach Complete message includes the TEID of the (e) NodeB 200*a*. As such, the UE 100 may transmit its uplink data to the S-GW 520 via the (e) NodeB 200*a*.

23-24) Meanwhile, the MME #a 510*a* sends a Modify Bearer Request message to the S-GW 520, for example. The modify bearer request message includes the TEID of the (e) NodeB 200*a*. The S-GW 520 sends the Modify Bearer Request message to the P-GW 530, which sends a Response message, e.g., Update Bearer Response message. The S-GW 520 then sends the response message to the MME #a 510*a*. Through this procedure, when the configured bearer is updated, the S-GW 520 transmits downlink data to the UE 100 via the (e) NodeB 200*a*.

<the Disclosure of the Present Specification>

Definition of Terms

MINT: Minimization of Service Interruption

Attached for disaster roaming services: A UE is considered as "attached for disaster roaming services in EPS" when it has successfully completed attach or tracking area update for disaster roaming services.

Initial attach for disaster roaming services: An attach procedure performed with EPS attach type "disaster roaming attach in EPS" in the ATTACH REQUEST message.

Tracking area update for disaster roaming services: A tracking area update procedure performed with EPS attach type "disaster roaming tracking area updating in EPS" in the ATTACH REQUEST message.

Figure 9:
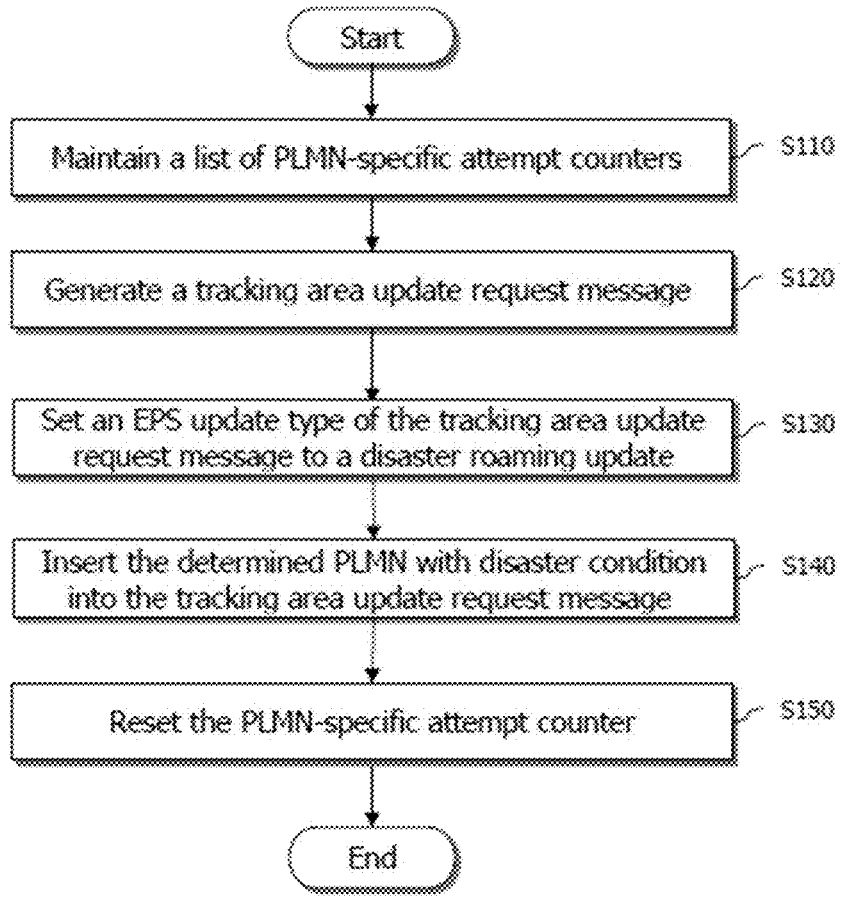
FIG. 9 is an example diagram illustrating a procedure according to one embodiment of this specification.

FIG. 9 is an example diagram illustrating a procedure according to one embodiment of this specification.

Referring to FIG. 9, when the UE supports Minimization of Service Interruption (MINT)—Evolved Packet System (EPS), the UE may maintain a list of public land mobile network (PLMN)-specific attempt counters for a determined PLMN with disaster condition (S110).

The UE may generate a tracking area update request message (S120).

If the tracking area update request message is for a disaster roaming service, the UE may set an EPS update type of the tracking area update request message to a disaster roaming update (S130).

When initiating a tracking area update procedure with the EPS update type set to the disaster roaming update, the UE may insert the determined PLMN with disaster condition into the tracking area update request message (S140).

If a tracking area update accept message is received from a first PLMN, and if the tracking area update accept message is for the disaster roaming service, the UE may reset a PLMN-specific attempt counter of the first PLMN for the determined PLMN with disaster condition (S150).

The UE may determine whether the UE supports the MINT-EPS.

If an attach accept message is received from the first PLMN, and if the attach accept message is for the disaster roaming service, the UE may reset the PLMN-specific attempt counter of the first PLMN for the determined PLMN with disaster condition.

If the UE has determined the determined PLMN with disaster condition, and if an additional globally unique temporary identifier (GUTI) is included in the tracking area update request message and does not contain a valid GUTI mapped from a previously assigned 5G-GUTI, the UE may insert the determined PLMN with disaster condition into the tracking area update request message.

If the UE has determined the determined PLMN with disaster condition, and if an additional GUTI is not included in the tracking area update request message and an EPS mobility identity does not contain a valid GUTI mapped from a previously assigned 5G-GUTI, the UE may insert the determined PLMN with disaster condition into the tracking area update request message.

SUMMARY OF THE EMBODIMENTS OF THIS SPECIFICATION

I. MINT-EPS for UE to Obtain Service in EPS Under Disaster Condition

The UE and the network may support Minimization of service interruption (MINT-EPS).

If the UE supports MINT-EPS, the indication of whether disaster roaming in EPS is enabled in the UE, the one or more "list of PLMN(s) to be used in disaster condition", if available, are stored in the non-volatile memory in the ME and are kept when the UE enters EMM-DEREGISTERED state If the UE supports MINT-EPS, the UE shall indicate this capability to the network during the attach procedure or tracking area updating procedure. Upon selecting a PLMN for disaster roaming in EPS, the UE shall perform an attach procedure with the EPS attach type set to "disaster roaming attach", or a tracking area updating procedure with the EPS update type set to "disaster roaming update" for an inter-system change from 5GS to EPS, for disaster roaming services. When the UE is attached for disaster roaming services, the MME shall only include TAIs covering the area with the disaster condition.

II. Specific Requirements for UE when Receiving Non-Integrity Protected Reject Messages If the UE receives an ATTACH REJECT, TRACKING AREA UPDATE REJECT or SERVICE REJECT message without integrity protection with EMM cause value #3, #6, #7, #8, #11, #12, #13, #14, #15, #31, #35 or #36 before the network has established secure exchange of NAS messages for the NAS signalling connection, the UE shall start timer T3247 with a random value uniformly drawn from the range between 30 minutes and 60 minutes, if the timer is not running, and take the following actions:

7) If the PLMN-specific attempt counter of the PLMN which sent the reject message for the UE determined PLMN with disaster condition has a value less than a UE implementation-specific maximum value, the UE shall increment the PLMN-specific attempt counter of the PLMN which sent the reject message for the UE determined PLMN with disaster condition.

Upon expiry of timer T3247, the UE shall if the UE maintains a list of PLMN-specific attempt counters, for each PLMN-specific attempt counter that has a value greater than zero and less than a UE implementation-specific maximum value, remove the respective PLMN from the extension of the "forbidden PLMNs" list if the UE is not attached on the PLMN for the disaster roaming services;

for each PLMN-specific attempt counter of the PLMN which sent the reject message for the UE determined PLMN with disaster condition that has a value greater than zero and less than a UE implementation-specific maximum value, consider the PLMN which sent the reject message is available for disaster roaming service for the respective UE determined PLMN with disaster condition.

III. Attach Procedure

III-1. Attach Accepted by the Network

If the UE receives the ATTACH ACCEPT message from a PLMN for which a PLMN-specific attempt counter or PLMN-specific PS-attempt counter is maintained, then the UE shall reset these counters if the ATTACH REQUEST was not sent for disaster roaming services. If the UE maintains a counter for "SIM/USIM considered invalid for GPRS services", then the UE shall reset this counter.

If the UE receives the ATTACH ACCEPT message from a PLMN and the attach is for the disaster roaming services, then the UE shall reset the PLMN-specific attempt counter of the PLMN for the UE determined PLMN with disaster condition.

IV. Tracking Area Update Procedure

IV-1. General

The tracking area updating procedure is always initiated by the UE and is used for the following purposes:
  to indicate to the network that the UE performs a tracking updating procedure for disaster roaming services.
IV-2. Normal and Periodic Tracking Area Updating Procedure Initiation The UE in state EMM-REGISTERED shall initiate the tracking area updating procedure by sending a TRACKING AREA UPDATE REQUEST message to the MME,
  zj) when the UE supports MINT-EPS and needs to perform a tracking area updating procedure for disaster roaming services.

For case zj, if the UE performs an inter-system change from NI mode to S1 mode due to a disaster condition, or if the UE initiates a tracking area updating procedure for disaster roaming services while in S1 mode, the UE shall set the EPS update type IE to "disaster roaming update" in the TRACKING AREA UPDATE REQUEST message. If the UE has determined the UE determined PLMN with disaster condition and:
  the Additional GUTI IE is included in the TRACKING AREA UPDATE REQUEST message and does not contain a valid GUTI mapped from a 5G-GUTI that was previously assigned by the IE determined PLMN with disaster condition; or
  the Additional GUTI IE is not included in the TRACKING AREA UPDATE REQUEST message and the EPS mobile identity IE does not contain a valid GUTI mapped from a 5G-GUTI that was previously assigned by the UE determined PLMN with disaster condition;
  the UE shall include in the TRACKING AREA UPDATE REQUEST message the UE determined PLMN with disaster condition IE indicating the UE determined PLMN with disaster condition.

If the initiates the tracking area updating procedure for disaster roaming services, and the UE determined PLMN with disaster condition cannot be determined when an E-UTRAN cell of the PLMN broadcasts the disaster related indication, the UE does not include in the TRACKING AREA UPDATE REQUEST message the UE determined PLMN with disaster condition IE but includes the Additional GUTI IE or the EPS mobile identity IE or both.

While the UE is registered for disaster roaming services in EPS and the disaster condition still applies, the UE shall continue to indicate "disaster roaming update" in the EPS update type IE.
IV-3. Normal and Periodic Tracking Area Updating Procedure Accepted by the Network If the UE receives the TRACKING AREA UPDATE ACCEPT message from a PLMN for which a PLMN-specific attempt counter or PLMN-specific PS-attempt counter is maintained, then the UE shall reset these counters if the TRACKING AREA UPDATE REQUEST was not sent for the disaster roaming services. If the UE maintains a counter for "SIM/USIM considered invalid for GPRS services", then the UE shall reset this counter.

If the UE receives the TRACKING AREA UPDATE ACCEPT message from a PLMN and the TRACKING AREA UPDATE ACCEPT is for the disaster roaming services, then the UE shall reset the PLMN-specific attempt counter of the PLMN for the UE determined PLMN with disaster condition.

If the EPS update type IE in the TRACKING AREA UPDATE REQUEST message is set to "disaster roaming update" and:
  a) the UE determined PLMN with disaster condition IE is included in the TRACKING AREA UPDATE REQUEST message, the MME shall determine the PLMN with disaster condition in the UE determined PLMN with disaster condition IE;
  b) the UE determined PLMN with disaster condition IE is not included in the TRACKING AREA UPDATE REQUEST message and the Additional GUTI IE is included in the TRACKING AREA UPDATE REQUEST message and contains a GUTI mapped from 5G-GUTI of a PLMN of the country of the PLMN providing disaster roaming services, the MME shall determine the PLMN with disaster condition in the PLMN identity of the GUTI mapped from 5G-GUTI;
  c) the UE determined PLMN with disaster condition IE and the Additional GUTI IE are not included in the TRACKING AREA UPDATE REQUEST message and the EPS mobile identity IE contains a GUTI mapped from 5G-GUTI of a PLMN of the country of the PLMN providing disaster roaming services, the MME shall determine the PLMN with disaster condition in the PLMN identity of the 5G-GUTI; or
  d) the UE determined PLMN with disaster condition IE is not included in the TRACKING AREA UPDATE REQUEST message, E-UTRAN of the PLMN providing disaster roaming services broadcasts disaster roaming indication and:
  1) the Additional GUTI IE is included in the TRACKING AREA UPDATE REQUEST message and contains a GUTI mapped from 5G-GUTI of a PLMN of a country other than the country of the PLMN providing disaster roaming services; or
  2) the Additional GUTI IE is not included and the EPS mobile identity IE contains a GUTI mapped from 5G-GUTI of a PLMN of a country other than the country of the PLMN providing disaster roaming services;
  the MME shall determine the PLMN with disaster condition based on the disaster roaming agreement arrangement between mobile network operators.
IV-4. Tracking Area Update Request Message The Tracking area update request message includes a UE determined PLMN with disaster condition The UE determined PLMN with disaster condition is as follows:

The UE shall include this IE only if the UE initiates a tracking area update procedure with update type "disaster roaming update" when the UE needs to indicate a UE determined PLMN with disaster condition to the network.

V. Additional Embodiments

According to one embodiment of the present invention, operations of a terminal and a network supporting Minimization of Service Interruption for EPS (MINT-EPS) are defined in a more sophisticated manner so that a terminal (UE) can stably acquire and maintain EPS (Evolved Packet System)-based communication services under a disaster condition. In particular, the present invention provides technically differentiated control methods covering the entire process, including determination of a disaster condition, selection of a PLMN for disaster roaming, execution of attach and tracking area update procedures, and processing of reject messages and state recovery, rather than merely allowing disaster roaming.

V-1. Extension of UE Operations for Disaster Condition Determination and Management According to one embodiment of the present invention, a UE may be configured to determine a disaster condition by comprehensively considering a plurality of determination factors, instead of relying solely on a single disaster-related indication received from a network. For example, the UE may calculate the reliability of a disaster condition by analyzing reception frequency, duration, and repetition of disaster-related indications received from a plurality of neighboring cells or a plurality of PLMNs.

In addition, the UE may be configured to determine that a disaster condition is valid only when the disaster-related indication is continuously received for a predetermined period of time, thereby preventing erroneous determination caused by temporary signal errors or short-term network instability. Such time-based determination logic may be implemented through an internal timer or a state machine of the UE.

Furthermore, the UE may store past disaster roaming history, such as whether disaster roaming services were successfully provided in a specific PLMN and whether service continuity during disaster roaming exceeded a predetermined threshold, and may reflect such history in the current disaster condition determination. Through this, the UE can make more reliable decisions in the same or similar disaster situations.

V-2. Intelligent Priority Determination for PLMN Selection Under Disaster Conditions According to one embodiment of the present invention, when selecting a PLMN to be used under a disaster condition, the UE does not arbitrarily select a permitted PLMN, but may determine priorities by comprehensively considering a disaster-dedicated PLMN list, past success history, and network load conditions.

For example, the UE may maintain a "PLMN list available in a disaster condition" stored in non-volatile memory, and may additionally store statistical information for each PLMN, such as the number of successful disaster roaming attempts, average service duration, and frequency of receiving reject messages. Based on such information, the UE may assign weights to respective PLMNs and select a PLMN having the highest priority as a target for disaster roaming.

In addition, the UE may dynamically adjust PLMN selection by receiving load-related information or service availability information broadcast by the network, and temporarily lowering the priority of a PLMN that is in an excessive load state.

V-3. Non-Volatile Memory Management Structure for Disaster-Related Information

According to one embodiment of the present invention, the UE may store disaster roaming-related information in a memory area logically separated from general roaming information. For example, whether disaster roaming is activated, a disaster-dedicated PLMN list, and disaster roaming success history may be stored in a disaster-dedicated data structure separate from general PLMN selection information.

Through such a separated storage structure, only disaster-related information may be selectively initialized or discarded when the disaster condition ends, without affecting general roaming operations. In addition, the UE may be configured to automatically delete disaster-dedicated information only when predetermined conditions (e.g., elapse of a certain period of time, successful re-registration to a normal PLMN) are satisfied after detection of the end of the disaster condition.

V-4. Enhanced Processing of Non-Integrity-Protected Reject Messages

According to one embodiment of the present invention, when the UE receives an ATTACH REJECT, TRACKING AREA UPDATE REJECT, or SERVICE REJECT message that is not integrity-protected, the UE may be configured to evaluate the reliability of the received message instead of mechanically operating based solely on a cause value.

For example, when the same EMM cause value is repeatedly received from the same PLMN, the UE may evaluate the reliability of the corresponding reject message as low. Conversely, when the same reject message is received from different cells or at different time points, the reliability may be evaluated as high. Such reliability evaluation may be reflected in whether to increase a PLMN-specific attempt counter or in the magnitude of such increase.

In addition, according to one embodiment of the present invention, a configuration method of a T3247 timer is also enhanced. That is, the timer value is not merely randomly selected within a fixed range, but may be dynamically adjusted based on disaster severity, previous failure counts, and UE mobility (e.g., speed, cell change frequency). Through this, unnecessary retry attempts can be reduced while improving the possibility of connection recovery under a disaster condition.

V-5. State-Based Control After Attach Acceptance

According to one embodiment of the present invention, the UE may be configured to re-verify a disaster roaming state even after receiving an ATTACH ACCEPT message. For example, after attach acceptance, the UE may verify whether tracking area information (TAI) provided by the network includes an area in which a disaster condition has actually occurred.

In addition, after successful attach, the UE may set a "disaster roaming success state flag," and may continue disaster roaming-specific operations by referring to the flag during subsequent tracking area update procedures, service request procedures, and cell reselection procedures. The flag may be released when the disaster condition ends or when the UE returns to a normal roaming state.

V-6. Intelligent Control at Initiation of Tracking Area Update Procedures

According to one embodiment of the present invention, when the UE initiates a tracking area update procedure, the UE may include additional logic for determining whether an inter-system transition (NI mode↔S1 mode) is necessary, beyond merely setting a disaster roaming update type.

For example, the UE may initiate a tracking area update procedure for disaster roaming only when a transition to EPS is practically advantageous, by comprehensively evaluating service quality available in 5GS, remaining EPS coverage, and previous transition success history. Through this, unnecessary system transitions can be prevented and power consumption of the UE can be reduced.

V-7. Extended Structure of UE Determined PLMN Information Element

According to one embodiment of the present invention, a UE determined PLMN with disaster condition information element may be extended to include a plurality of candidate PLMNs and priority information for each candidate, rather than including only a single PLMN identifier.

In addition, the information element may further include a field for identifying a disaster type (e.g., natural disaster, infrastructure failure, massive traffic surge), thereby allowing the network to apply policies suitable for the disaster type.

V-8. Policy-Based PLMN Determination by Network (MME)

According to one embodiment of the present invention, an MME may determine a PLMN under a disaster condition by referring not only to information received from a UE, but also to disaster information shared with neighboring MMEs or upper-level network nodes, and disaster roaming agreement policy tables among mobile network operators.

In particular, by distinguishing between PLMNs within the same country and PLMNs of other countries and applying different policies (e.g., allowed time, service scope, priority), resource efficiency and service stability under disaster conditions can be simultaneously ensured.

According to the embodiments described above, communication service interruption between the UE and the network under a disaster condition can be minimized while reducing unnecessary retry attempts and signaling load. In addition, stable disaster roaming services can be provided even in environments where non-integrity-protected messages pose security vulnerabilities, and smooth restoration to a normal communication environment after the end of a disaster can also be achieved.

Figure 10:
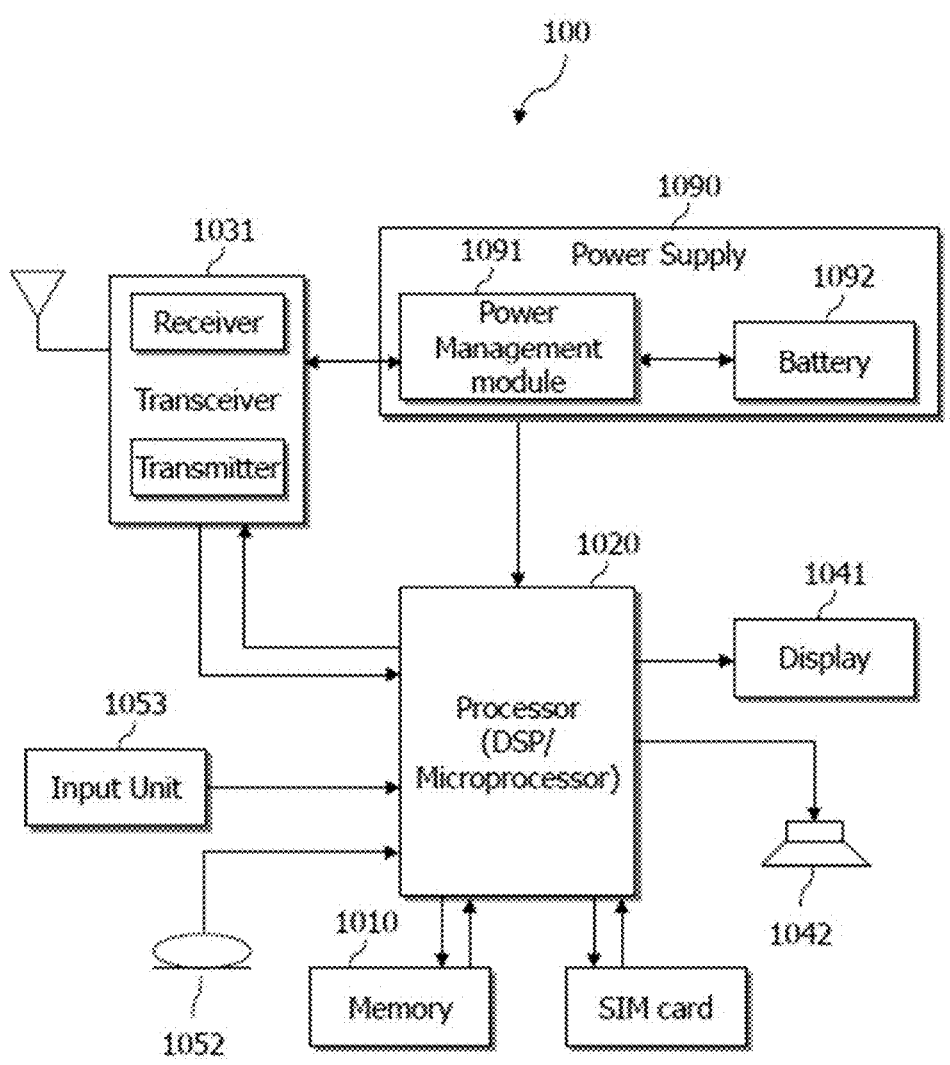
FIG. 10 is a block diagram showing a structure of a UE 100 according to an embodiment.

FIG. 10 is a block diagram showing a structure of a UE 100 according to an embodiment.

A UE 100 includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

The processor 1020 may be configured to implement the proposed functions, procedures, and/or methods described in the present specification. Layers of a radio interface protocol may be implemented in the processor 1020. The processor 1020 may include application-specific integrated circuits (ASICs), other chipsets, logic circuits, and/or data processing units. The processor 1020 may be an application processor (AP). The processor 1020 may include at least one of a digital signal processor (DSP), a central processing unit (CPU), a graphics processing unit (GPS), and a modulator and demodulator (modem). An example of the processor 1020 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

The power management module 1091 manages power for the processor 1020 and/or the transceiver 1031. The battery 1092 supplies power to the power management module 1091. The display 1041 outputs a result processed by the processor 1020. The input unit 1053 receives an input to be used by the processor 1020. The input unit 1053 may be displayed on the display 1041. The SIM card is an integrated circuit used to safely store an international mobile subscriber identity (IMSI) used to identify and authenticate a subscriber and a key related thereto in a portable phone and a portable phone device such as a computer. Contacts information may be stored in many SIM cards.

The memory 1010 is operatively coupled to the processor 1020, and stores a variety of information for operating the processor 1020. The memory 1010 may include a read-only memory (ROM), a random access memory (RAM), a flash memory, a memory card, a storage medium, and/or other equivalent storage devices. When the embodiment is implemented in software, the techniques explained in the present specification can be implemented with a module (i.e., procedure, function, etc.) for performing the functions explained in the present specification. The module may be stored in the memory 1010 and may be performed by the processor 1020. The memory 1010 may be implemented inside the processor 1020. Alternatively, the memory 1010 may be implemented outside the processor 1020, and may be coupled to the processor 1020 in a communicable manner by using various well-known means.

The transceiver 1031 is operatively coupled to the processor 1020, and transmits and/or receives a radio signal. The transceiver 1031 includes a transmitter and a receiver. The transceiver 1031 may include a baseband signal for processing a radio frequency signal. The transceiver controls one or more antennas to transmit and/or receive a radio signal. In order to initiate communication, the processor 1020 transfers command information to the transceiver 1031, for example, to transmit a radio signal constituting voice communication data. The antenna serves to transmit and receive a radio signal. When the radio signal is received, the transceiver 1031 may transfer a signal to be processed by the processor 1020, and may convert the signal into a baseband signal. The processed signal may be converted into audible or readable information which is output through the speaker 1042.

The speaker 1042 outputs a result related to a sound processed by the processor 1020. The microphone 1052 receives a sound-related input to be used by the processor 1020.

A user presses (or touches) a button of the input unit 1053 or drives voice (activates voice) by using the microphone 1052 to input command information such as a phone number or the like. The processor 1020 receives the command information, and performs a proper function such as calling the phone number or the like. Operational data may be extracted from the SIM card or the memory 1010. In addition, the processor 1020 may display command information or operational information on the display 1041 for user's recognition and convenience.

Figure 11:
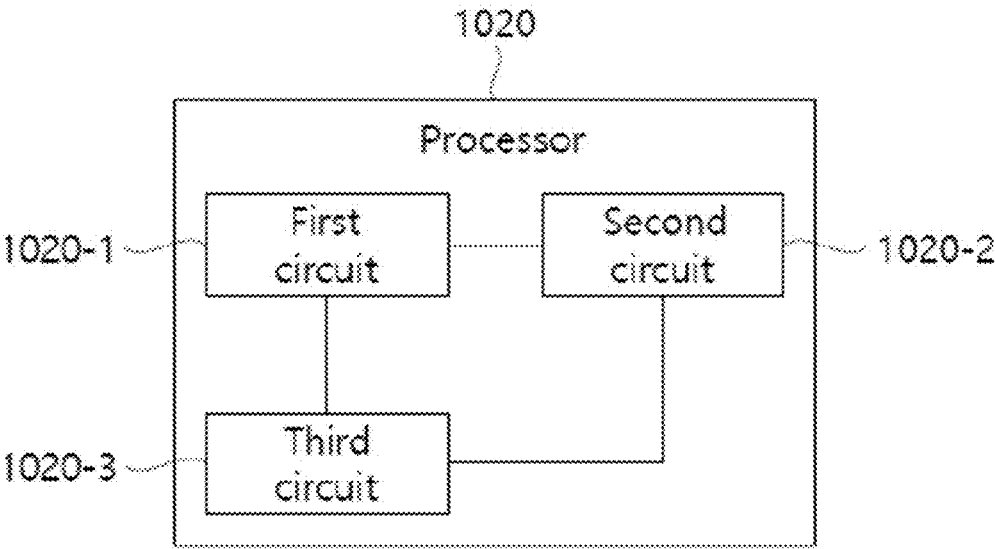
FIG. 11 illustrates a block diagram of a processor in which the present disclosure is implemented.

FIG. 11 illustrates a block diagram of a processor in which the present disclosure is implemented.

As may be seen from FIG. 11, the processor 1020 in which the present disclosure is implemented may include a plurality of circuitry to implement functions, procedures and/or methods described in the present disclosure. For example, the processor 1020 may include a first circuit 1020-1, a second circuit 1020-2, and a third circuit 1020-3. Also, although not shown in the figure, the processor 1020 may include more circuits. Each circuit may include a plurality of transistors.

When the UE supports Minimization of Service Interruption (MINT)-Evolved Packet System (EPS), the first circuit 1020-1 may maintain a list of public land mobile network (PLMN)-specific attempt counters for a determined PLMN with disaster condition.

The second circuit 1020-2 may generate a tracking area update request message.

If the tracking area update request message is for a disaster roaming service, the third circuit 1020-3 may set an EPS update type of the tracking area update request message to a disaster roaming update.

When initiating a tracking area update procedure with the EPS update type set to the disaster roaming update, the fourth circuit may insert the determined PLMN with disaster condition into the tracking area update request message.

If a tracking area update accept message is received from a first PLMN, and if the tracking area update accept message is for the disaster roaming service, a fifth circuit may reset a PLMN-specific attempt counter of the first PLMN for the determined PLMN with disaster condition.

The processor 1020 may be called Application-Specific Integrated Circuit (ASIC) or Application Processor (AP) and may include at least one of a Digital Signal Processor (DSP), a Central Processing Unit (CPU), and a Graphics Processing Unit (GPU).

The processor may be equipped in the UE.

In the above, preferred embodiments have been described by way of example, but the disclosure of the present specification is not limited to these specific embodiments, and may be modified, changed, or modified in various forms within the scope described in the spirit and claims of the present specification. It can be improved.

In the example system described above, the methods are described on the basis of a flow chart as a series of steps or blocks, but the order of steps described is not limited, and some steps may occur simultaneously or in a different order than other steps as described above. there is. Additionally, those skilled in the art will understand that the steps shown in the flowchart are not exclusive and that other steps may be included or one or more steps in the flowchart may be deleted without affecting the scope of rights.

The claims set forth herein may be combined in various ways. For example, the technical features of the method claims of this specification may be combined to implement a device, and the technical features of the device claims of this specification may be combined to implement a method. Additionally, the technical features of the method claims of this specification and the technical features of the device claims may be combined to implement a device, and the technical features of the method claims of this specification and technical features of the device claims may be combined to implement a method.

What is claimed is:

1. An operation method of user equipment (UE), comprising:
maintaining a list of public land mobile network (PLMN)-specific attempt counters for a determined PLMN with disaster condition for the UE supporting a minimization of service interruption (MINT)-evolved packet system (EPS);
generating a tracking area update request message;
setting an EPS update type in the tracking area update request message to a disaster roaming update, corresponding to the disaster roaming service;
inserting the determined PLMN with disaster condition into the tracking area update request message in response to initiating a tracking area update procedure with the EPS update type set to the disaster roaming update; and
resetting a PLMN-specific attempt counter of a first PLMN for the determined PLMN with disaster condition, in response to receiving a tracking area update accept message from the first PLMN for the disaster roaming service,
wherein the determined PLMN with disaster condition is inserted into the tracking area update request message, when the UE has determined the determined PLMN with disaster condition, and when an additional globally unique temporary identifier (GUTI) is included in the tracking area update request message and does not contain a valid GUTI mapped from a 5G-GUTI which was previously assigned.

2. The method of claim 1, further comprising:
determining whether the UE supports the MINT-EPS.

3. The method of claim 1, further comprising:
resetting the PLMN-specific attempt counter of the first PLMN for the determined PLMN with disaster condition, if an attach accept message is received from the first PLMN and if the attach accept message is for the disaster roaming service.

4. The method of claim 1, wherein the determined PLMN with disaster condition is inserted into the tracking area update request message, if the UE has determined the determined PLMN with disaster condition, and if an additional GUTI is not included in the tracking area update request message and an EPS mobility identity does not contain a valid GUTI mapped from a 5G-GUTI which was previously assigned.

5. A user equipment (UE), the UE comprising:
at least one processor; and
at least one computer memory operably connectable to the at least one processor and storing instructions that, when executed by the at least one processor, perform operations comprising:
maintaining a list of public land mobile network (PLMN)-specific attempt counters for a determined PLMN with disaster condition if the UE supports a minimization of service interruption (MINT)-evolved packet system (EPS) is supported;
generating a tracking area update request message;
setting an EPS update type in the tracking area update request message to a disaster roaming update, if the tracking area update request message is for the disaster roaming service;
inserting the determined PLMN with disaster condition into the tracking area update request message if the UE initiates a tracking area update procedure with the EPS update type set to the disaster roaming update; and
resetting a PLMN-specific attempt counter of a first PLMN for the determined PLMN with disaster condition, if a tracking area update accept message is received from the first PLMN and if the tracking area update accept message is for the disaster roaming service,
wherein the determined PLMN with disaster condition is inserted into the tracking area update request message, if the UE has determined the determined PLMN with disaster condition, and if an additional globally unique temporary identifier (GUTI) is included in the tracking area update request message and does not contain a valid GUTI mapped from a 5G-GUTI which was previously assigned.

6. The UE of claim 5, wherein the operations further comprise:
determining whether the UE supports the MINT-EPS.

7. The UE of claim 5, wherein the operations further comprise:

resetting the PLMN-specific attempt counter of the first PLMN for the determined PLMN with disaster condition, if an attach accept message is received from the first PLMN and if the attach accept message is for the disaster roaming service.

8. The UE of claim 5, wherein the determined PLMN with disaster condition is inserted into the tracking area update request message, if the UE has determined the determined PLMN with disaster condition, and if an additional GUTI is not included in the tracking area update request message and an EPS mobility identity does not contain a valid GUTI mapped from a 5G-GUTI which was previously assigned.

9. A semiconductor chipset, comprising:

at least one processor; and at least one memory capable of storing instructions and being connected electrically to the at least one processor operably, wherein operations, performed when the instructions are executed by the at least one processor, includes:

maintaining a list of public land mobile network (PLMN)-specific attempt counters for a determined PLMN with disaster condition if the UE supports a minimization of service interruption (MINT)-evolved packet system (EPS) is supported;

generating a tracking area update request message;

setting an EPS update type in the tracking area update request message to a disaster roaming update, if the tracking area update request message is for the disaster roaming service;

inserting the determined PLMN with disaster condition into the tracking area update request message if the UE initiates a tracking area update procedure with the EPS update type set to the disaster roaming update; and resetting a PLMN-specific attempt counter of a first PLMN for the determined PLMN with disaster condition, if a tracking area update accept message is received from the first PLMN and if the tracking area update accept message is for the disaster roaming service, wherein the determined PLMN with disaster condition is inserted into the tracking area update request message, if the UE has determined the determined PLMN with disaster condition, and if an additional globally unique temporary identifier (GUTI) is included in the tracking area update request message and does not contain a valid GUTI mapped from a 5G-GUTI which was previously assigned.

10. The semiconductor chipset of claim 9, wherein the operations further comprise:

determining whether the UE supports the MINT-EPS.

11. The semiconductor chipset of claim 9, wherein the operations further comprise:

resetting the PLMN-specific attempt counter of the first PLMN for the determined PLMN with disaster condition, if an attach accept message is received from the first PLMN and if the attach accept message is for the disaster roaming service.

12. The semiconductor chipset of claim 9, wherein the determined PLMN with disaster condition is inserted into the tracking area update request message, if the UE has determined the determined PLMN with disaster condition, and if an additional GUTI is not included in the tracking area update request message and an EPS mobility identity does not contain a valid GUTI mapped from a 5G-GUTI which was previously assigned.

* * * * *